United States Patent [19]

Teague et al.

[11] Patent Number: 5,761,411

[45] Date of Patent: Jun. 2, 1998

[54] METHOD FOR PERFORMING DISK FAULT PREDICTION OPERATIONS

[75] Inventors: Gaines C. Teague, Austin; Kenneth L. Bush, Houston, both of Tex.; Jonathan R. Didner, Hillsboro, Oreg.; Thomas R. Lenny, Houston, Tex.

[73] Assignee: Compaq Computer Corporation, Houston, Tex.

[21] Appl. No.: 518,831

[22] Filed: Aug. 24, 1995

Related U.S. Application Data

[63] Continuation-in-part of Ser. No. 404,812, Mar. 13, 1995.

[51] Int. Cl.$^6$ .................................................. G06F 11/00
[52] U.S. Cl. ........................ 395/184.01; 395/183.18; 395/185.01
[58] Field of Search .............. 395/184.01, 183.18, 395/183.16, 185.02, 182.04, 183.01, 185.07, 182.03, 185.01; 371/21.1, 21.2, 21.3, 21.4, 21.5, 21.6, 51.1; 364/551.01

[56] References Cited

U.S. PATENT DOCUMENTS

| | | | |
|---|---|---|---|
| 3,704,363 | 11/1972 | Salmassy et al. | 235/153 |
| 4,268,905 | 5/1981 | Johann et al. | 364/200 |
| 4,348,761 | 9/1982 | Berger | 371/21 |
| 4,725,968 | 2/1988 | Baldwin et al. | 364/550 |
| 4,841,389 | 6/1989 | Hoyt et al. | 360/75 |
| 5,410,439 | 4/1995 | Egbert et al. | 360/75 |
| 5,422,890 | 6/1995 | Klingsporn et al. | 371/21.6 |
| 5,469,463 | 11/1995 | Polich et al. | 395/182.18 |
| 5,500,940 | 3/1996 | Skeie | 395/183.18 |
| 5,557,183 | 9/1996 | Bates et al. | 318/434 |
| 5,566,316 | 10/1996 | Fechner et al. | 395/182.04 |

*Primary Examiner*—Robert W. Beausoliel, Jr.
*Assistant Examiner*—Joseph E. Palys
*Attorney, Agent, or Firm*—Jenkens & Gilchrist, P.C.

[57] ABSTRACT

A layered block device driver for accessing a storage device coupled to a computer system having a platform on which a disk fault prediction application operates. The layered block device driver includes a file system driver coupled to the computer system, at least one upper level driver coupled to the file system driver, an intermediate driver having a first coupling with the upper level driver for the exchange of messages between the intermediate driver and the upper level driver and a second coupling with the application which controls the exchange of messages between the application and the storage device, and a port driver coupled to the intermediate driver and the storage device. The intermediate driver includes an application processing routine for controlling exchanges between the application and the storage device, an upper level driver processing routine for handling exchanges between the upper level driver and the port driver, a queuing routine coupled to the application processing routine and the upper level processing routine, a flag coupled to the application processing routine and the upper level processing routine, a counter coupled to the application processing routine and the upper level processing routine and an interrupt routine coupled to the application processing routine, the upper level processing routine and the queuing routine.

19 Claims, 6 Drawing Sheets

| DESCRIPTION | BYTES | FORMAT | TYPE |
|---|---|---|---|
| DATA STRUCTURE REV. NO. | 1 | BINARY | RD ONLY |
| 1ST DRIVE ATTRIBUTE | 2 | VARIES | RD/WRT |
| ⋮ | " | " | " |
| ⋮ | " | " | " |
| 30TH DRIVE ATTRIBUTE | 12 | VARIES | RD/WRT |
| RESERVED | 100 | | RD/WRT |
| VENDOR UNIQUE | 49 | | RD ONLY |
| DATA STRUCTURE CHECKSUM | 1 | | RD ONLY |
| TOTAL BYTES | 512 | | |

*FIG. 3*

| DESCRIPTION | BYTES | FORMAT | TYPE |
|---|---|---|---|
| ATTRIBUTE ID NO. | 1 | BINARY | RD ONLY |
| STATUS FLAGS | 2 | BIT FLAGS | RD ONLY |
| PRE-FAILURE WARRANTY | | | |
| ON-LINE COLLECTION | | | |
| PERF. ATTRIBUTE TYPE | | | |
| ERROR RATE ATTRIBUTE TYPE | | | |
| EVENT COUNT ATTRIBUTE TYPE | | | |
| SELF-PRESERVING ATTRIBUTE TYPE | | | |
| RESERVED | | | |
| NORMALIZED ATTRIBUTE VALUE | 1 | BINARY | RD ONLY |
| WORST EVER NORMALIZED ATTRIBUTE VALUE | 1 | BINARY | RD ONLY |
| RAW ATTRIBUTE VALUE | 6 | BINARY | RD ONLY |
| RESERVED | 1 | | RD ONLY |
| TOTAL BYTES | 12 | | |

*FIG. 4*

| | DESCRIPTION | BYTES | FORMAT | TYPE |
|---|---|---|---|---|
| 68 — | DATA STRUCTURE REV. NO. | 2 | BINARY | RD ONLY |
| 70-1 — | 1ST DRIVE ATTRIBUTE | 12 | BINARY | RD/WRT |
| | ⋮ | " | " | " |
| | ⋮ | " | " | " |
| 70-30 — | 30TH DRIVE ATTRIBUTE | 12 | BINARY | RD/WRT |
| 72 — | RESERVED | 100 | | RD/WRT |
| 74 — | VENDOR UNIQUE | 49 | | RD ONLY |
| 76 — | DATA STRUCTURE CHECKSUM | 1 | | RD ONLY |
| | TOTAL BYTES | 512 | | |

*FIG. 5*

| | DESCRIPTION | BYTES | FORMAT | TYPE |
|---|---|---|---|---|
| 78 — | ATTRIBUTE ID NO. | 1 | BINARY | RD ONLY |
| 80 — | WARRANTY FAILURE THRESHOLD | 1 | BINARY | RD/WRT |
| 82 — | RESERVED | 10 | | RD/WRT |
| | TOTAL BYTES | 12 | | |

*FIG. 6*

METHOD FOR PERFORMING DISK FAULT PREDICTION OPERATIONS

CROSS REFERENCE TO RELATED APPLICATIONS

This application is a continuation-in-part of U.S. patent application Ser. No. 08/404,812 filed Mar. 13, 1995, entitled "Drive Failure Prediction Techniques for ATA Disk Drives", pending, assigned to the Assignee of the present application and hereby incorporated by reference as if reproduced in its entirety.

This application is also related to U.S. patent application Ser. No. 08/519,104 entitled "IDE Disk Fault Prediction Virtual Driver" and U.S. Ser. No. 60/002,702 entitled "Hardware Component Interface for Desktop Management System", both of which were filed on even date herewith, assigned to the Assignee of the present application and hereby incorporated by reference as if reproduced in their entirety.

BACKGROUND OF THE INVENTION

1. Field of the Invention

The present invention generally relates to disk fault prediction techniques for storage devices and, more particularly, relates to a method which enables a Windows 95 application to access an IDE device such that disk fault prediction operations may be performed.

2. Description of Related Art

The vast majority of personal computer (or "PC") systems available today come equipped with a peripheral storage device such as a hard disk drive. These storage devices, commonly referred to as ATA or IDE disk drives, have become an essential part of PC systems.

While quite reliable, ATA disk drives will occasionally fail. As a result, the associated PC system will be down while the ATA disk drive is replaced. Additionally, the drive failure may cause the loss of some or all of the data stored on the ATA disk drive. While much of the data stored on a failed drive is recoverable, the recovery of such data may prove both costly and time consuming. Thus, unless the ATA disk drive was backed up immediately prior to the drive failure, the cost of an unscheduled failure of a disk drive may be great.

There are two general classes of failures that can occur in ATA disk drives. The first class is the "on/off" type of failure which causes the drive to quickly and unpredictably fail. The drive failure prediction techniques disclosed herein are not expected to be able to predict "on/off" failures of ATA disk drives. The second class of failures result due to the gradual decay of electrical and/or mechanical components within the ATA disk drive. It is hoped that the drive failure prediction techniques disclosed herein will be able to predict 20% of these "gradual" failures of ATA disk drives.

As disclosed herein, drive failure prediction (also known as "disk fault prediction" or "DFP") is a technique by which the operation of a disk drive is monitored, preferably, by monitoring key disk drive attributes, and analyzed such that the user may be notified of potential drive failures before they occur. By providing advance warning of a drive failure, the user may schedule the computer for drive replacement, thereby avoiding the unplanned interruptions and potential data loss caused by a drive failure.

While certain aspects of disk fault prediction have been incorporated into complex computer management systems generally characterized by plural instrumentation agents for querying manageable devices to collect object data, an associated enterprise management information base for storing the collected object data in accordance with a specified MIB architecture and a graphical user interface for managing the manageable devices using the enterprise MIB, generally, disk fault prediction has remained unavailable on smaller systems. As part of the gradual development of intelligent manageability for desktop computers, the incorporation of disk fault prediction techniques into desktop computers and small networks has become increasingly important.

In U.S. patent application Ser. No. 08/404,812 filed Mar. 13, 1995, a method for predicting potential failures of storage devices such as ATA disk drives was disclosed. However, in that application, it was presumed that the CPU which performed the disclosed drive failure prediction techniques could directly access the ATA storage device for which drive failure prediction was desired. More specifically, in order to implement drive failure prediction techniques, access to the disk controller for the storage device is required. However, such access is not available in many operating computer systems, most notably, Microsoft's "Windows 95" operating system which is presently expected to become commercially available in August, 1995. Without such access, disk fault prediction cannot be provided for computer systems using the Windows 95 operating system.

Thus, it can be readily seen from the foregoing that it would be desirable to provide method for accessing an IDE drive such that disk fault prediction operations may be performed by a DFP application using a Windows 95 operating system. It is, therefore, the object of this invention to provide such a method.

BRIEF SUMMARY OF THE INVENTION

In one embodiment, the present invention is of a method for predicting an imminent failure of a storage device coupled to a computer system having a platform on which a DFP application operates. At least one disk fault prediction command is issued from the DFP application and an attribute considered as indicative of an imminent failure of a storage device is selected for monitoring. The selected attribute is then monitored during operation of the storage device and, based upon changes in the monitored attribute, a prediction of an imminent failure of the storage device is issued. In one aspect, the computer system is coupled to the storage device by a layered block device driver having an intermediate device driver and the DFP application is coupled to the storage device by a DFP interface. The intermediate device driver is independently coupled to the DFP interface. In this aspect, the disk fault prediction command is issued by transferring the command to the DFP interface which, in turn, delivers the command to the storage device. In another aspect, the layered block device driver further includes a file system driver coupled to the computer system and to the intermediate device driver and a port driver coupled to the intermediate device driver and the storage device. In this aspect, non-disk fault prediction messages for the storage device are issued from the computer system to the file system driver.

In another aspect, the prediction of an imminent failure of the storage device is determined by selecting a threshold value for the selected attribute and, upon determining that the monitored attribute has crossed the selected threshold value, predicting the imminent failure of the storage device. In alternate aspects thereof, the selected attribute may be a performance attribute, an error rate attribute or an event count attribute. For the performance attribute, imminent failure is predicted upon detection of a degradation in the performance attribute such that the monitored performance attribute has a speed less than the threshold performance speed for the selected performance attribute. For the error rate attribute, imminent failure is predicted upon detection of an increase in the error rate attribute such that the monitored error rate attribute has an error rate greater than the threshold error rate. For the event count attribute, imminent failure is predicted upon detection of an increase in the event rate attribute such that the monitored event count attribute has an event count greater than the threshold event count.

In another embodiment, the present invention is of a method for predicting an imminent failure of a storage device coupled to an upper level driver of a computer system having a platform on which a DFP application operates. In accordance with the method of the present invention, the storage device is reserved for the DFP application and commands from the DFP application are directed to the storage device while upper level driver commands are queued whenever the DFP application has reserved the storage device. At least one disk fault prediction command is issued from the DFP application and an attribute considered as indicative of an imminent failure of a storage device is selected for monitoring. The selected attribute is then monitored during operation of the storage device and, based upon changes in the monitored attribute, a prediction of an imminent failure of the storage device is issued. In one aspect thereof, the storage device is reserved by the upper level driver and commands from the upper level driver are directed to the storage device while DFP application commands are queued whenever the upper level driver has reserved the storage device. In another aspect thereof, the storage device issues an interrupt and then transfers a reply to the upper level driver if the reply relates to the upper level driver command or transfers the reply to the DFP application if the reply relates to the DFP application command.

In another aspect thereof, the prediction of an imminent failure of the storage device is determined by selecting a threshold value for the selected attribute and, upon determining that the monitored attribute has crossed the selected threshold value, predicting the imminent failure of the storage device. In alternate aspects thereof, the selected attribute may be a performance attribute, an error rate attribute or an event count attribute. For the performance attribute, imminent failure is predicted upon detection of a degradation in the performance attribute such that the monitored performance attribute has a speed less than the threshold performance speed for the selected performance attribute. For the error rate attribute, imminent failure is predicted upon detection of an increase in the error rate attribute such that the monitored error rate attribute has an error rate greater than the threshold error rate. For the event count attribute, imminent failure is predicted upon detection of an increase in the event rate attribute such that the monitored event count attribute has an event count greater than the threshold event count.

BRIEF DESCRIPTION OF THE DRAWING

The present invention may be better understood, and its numerous objects, features and advantages will become apparent to those skilled in the art by reference to the accompanying drawing, in which:

FIG. 3 is a block diagram of a data structure for a drive attribute values sector of the storage device of FIG. 1;

FIG. 4 is a block diagram of a data structure for a drive attribute value of the drive attribute values sector of FIG. 3;

FIG. 5 is a block diagram of a data structure for the warranty failure thresholds sector of the storage device of FIG. 1;

FIG. 6 is a block diagram of a data structure for a warranty failure threshold of the warranty failure thresholds sector of FIG. 5;

DETAILED DESCRIPTION

Figure 1:
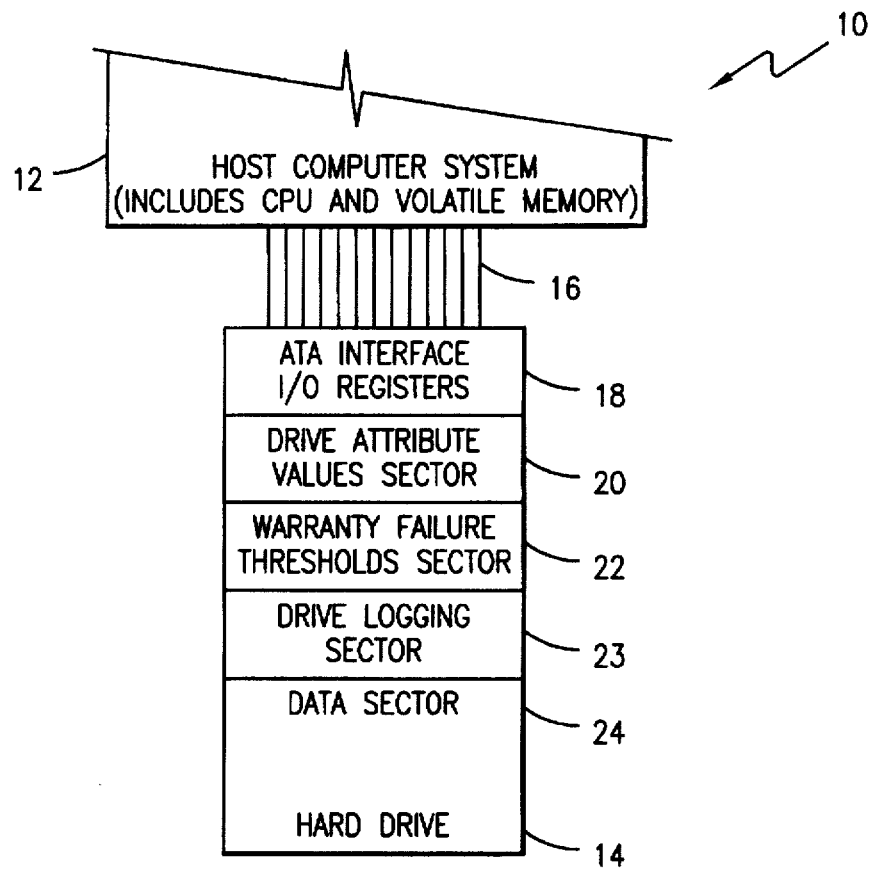
FIG. 1 is a block diagram of a host computer system constructed in accordance with the teachings of the present invention and configured for predicting drive failures for a storage device coupled thereto.

Referring now to FIG. 1, a computer system 10, for example, a personal computer (or "PC") system, configured for predicting drive failures of a storage device 14, for example, a hard drive, coupled thereto will now be described in greater detail. As is conventional in the art, the computer system 10 includes a host computer 12, which includes a central processing unit (or "CPU") and a volatile memory such as a random access memory (or "RAM"). The host computer 12 is coupled to the storage device 14 by a physical interface 16, for example a 40 pin connector. The storage device 14 is comprised of an AT attachment (or "ATA") interface input/output (or "I/O") registers 18 through which communication to or from the storage device 14 is routed, a drive attribute values sector 20 in which drive attributes considered to be key leading indicators of impending failures of the storage device 14 are periodically stored, a warranty failure thresholds sector 22 in which limits for each drive attribute value, above which the storage device 14 is deemed to have failed even though it may still be operational, are stored and data sector 24 in which other information may be stored for later retrieval.

Figure 2:
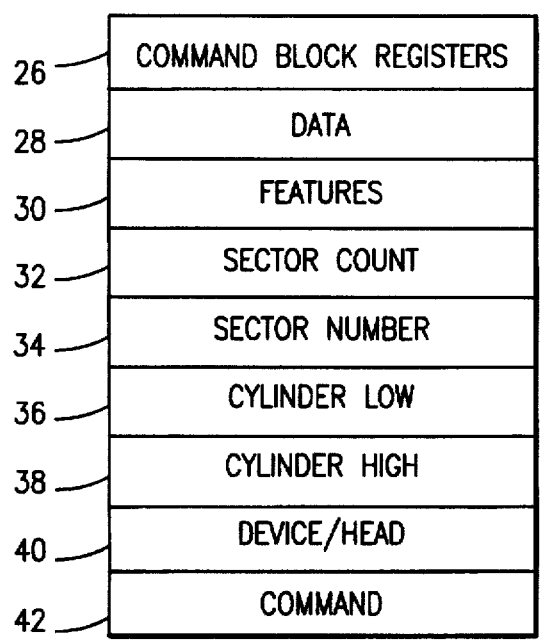
FIG. 2 is a block diagram of a command block register portion of the ATA interface I/O registers of the storage device of FIG. 1.

Referring next to FIG. 2, command block registers 26, which form a portion of the ATA interface I/O registers 18, will now be described in greater detail. Data register 28, which may be either 8-bits or 16-bits wide, holds data being transferred between the host computer 12 and the storage device 14 during either a read operation or a write operation. Features register 30 is command specific and may be used to enable and disable features of the ATA interface. Sector count register 32 contains the number of sectors of data to be transferred during a read operation or a write operation between the host computer 12 and the storage device 14. Sector number register 34 contains a starting sector number for a cylinder-head-sector (or "CHS") mode access of the storage device 14. Cylinder low register 36 contains the lower order bits of a starting cylinder address for a CHS mode access of the storage device 14. Cylinder high register 38 contains the high order bits of the starting cylinder address for a CHS mode access of the storage device 14. Device/head register 40 contains device addressing and sector addressing information for accesses of the storage device 14. Finally, command register 42 holds command code being transferred to the storage device 14 by the host computer 12.

The detailed mechanism by which the aforementioned command block registers 26 are utilized to perform read or write operations between the host computer 12 and the storage device 14 is well known in the art and need not be described in greater detail. However, to perform drive failure prediction management operations in accordance with the teachings of the present invention, an execute drive failure prediction command must be issued to the storage device 14. To eliminate inadvertent or unauthorized access to drive failure prediction management operations, the execute drive failure prediction command will be aborted unless a key has been loaded into the cylinder low and cylinder high registers 36 and 38. More specifically, prior to writing the execute drive failure prediction command 0×B0 to the command register 42, key codes 0×4F and 0×C2 must be respectively loaded into the cylinder low and cylinder high registers 36 and 38. As the aforementioned key codes do not correspond to any cylinder address for the storage device 14, the storage device 14 will not misinterpret the key codes as an cylinder address for the storage device 14. Upon receipt of the key codes and the execute drive failure prediction command, the storage device 14 will execute the command function contained in the features register 30.

The command functions which may be performed during drive failure prediction management operations and the function code which must be placed in the features register 30 for the function to be executed are set forth in Table I, below.

TABLE I

| CODE | COMMAND FUNCTION |
| --- | --- |
| 0xD0 | "Return Drive Attribute Values" |
| 0xD1 | "Read Warranty Failure Thresholds" |
| 0xD2 | Reserved |
| 0xD3 | "Write Current Attribute Values To Disk" |
| 0xD4 | "Perform Off-Line Data Collection" |
| 0xD5 | "Read Drive Logging Sectors" |
| 0xD6 | "Write Drive Logging Sectors" |
| 0xD7 | "Write Warranty Failure Thresholds" |
| 0xD8 | "Enable Failure Prediction Operations" |
| 0xD9 | "Disable Failure Prediction Operations" |
| 0xDA | Reserved |
| . . . | " |
| 0xDF | Reserved |

Upon receipt of the "Return Drive Attribute Values" command, the current drive attribute values stored in volatile memory are transferred from the host computer 12 to the storage device 14 where they are stored in the drive attributes values sector 20 as saved attribute values. Upon receipt of the "Read Warranty Failure Thresholds" commands, the values of warranty failure thresholds stored in the warranty failure thresholds sector 22 of the storage device 14 are transferred to the volatile memory of the host computer system 12. Upon receipt of the "Write Current Attribute Values To Disk" command, the current attribute values contained in the volatile memory of the host computer 12 are stored in the drive attribute values sector of the storage device 14 as saved attribute values.

Data which is useful to drive failure prediction is either collected on-line, i.e., during normal operations of the storage device 14 or off-line, i.e. after interrupting normal operations of the storage device 14. Data which may be collected without interfering with the normal operations of the storage device 14 is collected on-line. Data collection which would interfere with the normal operations of the storage device 14 is collected off-line. On-line data collection is described in greater detail with respect to FIGS. 7A–B, below. Data which should be collected off-line includes selected performance and drive functionality tests such as sequentially scanning the entire disk for defects, measuring the read error rate, the read channel margin or the seek error rate, or performing the data throughput test. To perform any of these tests, the "Perform Off-Line Data Collection" command must first be placed in the features register 30.

In alternate embodiments of the present invention, off-line data collection initiated by the "Perform Off-Line Data Collection" may be accomplished in any one of three possible methods which primarily differ according to how many times the "Perform Off-Line Data Collection" must be issued. The first method requires the issuance of only a single "Perform Off-Line Data Collection" command. In accordance with this method of offline data collection, off-line data collection is segmented as a single segment, off-line task to be performed as a background task. If interrupted by another command, off-line data collection is suspended until the interrupting command is completed. Off-line data collection will then resume. The second method requires the issuance of multiple "Perform Off-Line Data Collection" commands. In accordance with this method of off-line data collection, off-line data collection is segmented as a multiple segment, off-line task to be performed as a background task. If interrupted by another command, off-line data collection is suspended until the interrupting command is complete. Off-line data collection will then resume until the interrupted segment is completed. To proceed with the next segment of off-line data collection, a separate "Perform Off-Line Data Collection" command must be issued.

The third and final method for off-line collection is to segment off-line data collection as either a single or a multiple segment off-line task that is performed as a foreground task and cannot be performed as a background task. If interrupted by another command, this method may either complete the current segment and execute the interrupting command, save its off-line processing state and execute the interrupting command or abort the current off-line segment and execute the interrupting command. After completing the interrupting command, off-line data collection will not resume until another "Perform Off-Line Data Collection" command is received.

Upon receipt of the "Read Drive Logging Sectors" command, the contents of the drive logging sector 23 may be read. Stored in the drive logging sector 23 is historical information regarding the operation of the storage device 14. Logging information which may be stored in the drive logging sector 23 may include counts and statistics maintained by the storage device 14, for example, total number of sectors reads, total number of sector writes, total number of seeks, seek length histograms, request size histograms and others.

It is contemplated that an analysis of the logging information stored in the drive logging sector 23, together with the attribute values stored in the drive attribute values sector 20, can place an imminent drive failure prediction into context, i.e. identify if the prediction of a drive failure was, in fact, caused by an imminent failure of the drive. For example, if an imminent drive failure prediction was issued due to the value of the sector read error rate attribute crossing the warranty failure threshold for that attribute, a review of the logging information stored in the drive logging sector 23 may indicate that the imminent drive failure prediction was preceded by an unusually high number of sector reads. Such an occurrence would suggest that it was the heavy usage of the storage device 14, and not an erroneous operation of the storage device 14 itself, which triggered the prediction of an imminent drive failure.

Upon receipt of the "Write Drive Logging Sectors" command, the storage device 14 will prepare for the receipt of 512 bytes of data to be written to the drive logging sector 23 via the data register 28. It is contemplated that the "Write Drive Logging Sectors" command will be used as a debug tool to verify proper operation of the other execute drive failure prediction command functions.

Warranty failure threshold values may be updated using the "Write Warranty Failure Thresholds" command. Specifically, upon receipt of the "Write Warranty Failure Thresholds" command, the storage device 14 will prepare for the receipt of 512 bytes of data to be written to the warranty failure thresholds sector 22, via the data register 28, to overwrite the prior contents of the warranty failure thresholds sector 22.

Finally, drive failure prediction may be selectively enabled or disabled by respectively issuing the "Enable Failure Prediction Operations" or the "Disable Failure Prediction Operations" commands. When drive failure prediction is disabled, drive attributes are neither monitored nor updated. The state of the enable/disable failure prediction flags are preserved by the storage device 14 across power cycles, thereby preventing a power down or power up from inadvertently enabling or disabling failure prediction operations.

Referring next to FIG. 3, the data structure for the drive attribute values sector 20 in which the saved values for the drive attributes are stored may now be seen. The drive attribute values sector includes a data structure revision number 44 which identifies the version of the data structure implemented in the drive attribute values sector 20. Initially, the data structure revision number 44 will be set to 0×0001 and incremented by one for each new revision. The drive attribute values sector further includes thirty drive attributes 46-1 through 46-30, each of which will contain a saved value for a particular attribute if such attribute is supported by the storage device 14. Preferably, attributes supported by the storage device 14 should all be concatenated together directly after the data structure revision number 44. Attributes which are not supported by the storage device 14 are not included, leaving that portion of the data structure blank, i.e. set to 0×00. Finally, the drive attribute values sector 20 includes a region 48 reserved for future attributes, a region 50 reserved for attributes unique to a single vendor and a checksum 52 for detecting errors during a write to the drive attribute values sector 20.

Referring next to FIG. 4, the data structure for a drive attribute will now be described in greater detail. Attribute identification number (or "ID No.") region 54 uniquely identifies each attribute 46-1 through 46-30. Status flags region 56 includes a collection of bit flags which contain information regarding each particular attribute. Pre-failure warranty bit 56-1 identifies whether a particular failure identified by the attribute 46-N is covered under a warranty offered by the drive manufacturer. If the pre-failure warranty bit 56-1 is set to 0, a failure indicated by the value of the attribute 46-N exceeding the threshold value does not constitute a failure covered under the drive warranty. If, however, the pre-failure warranty bit 56-1 is set to 1, a failure indicated by the value of the attribute 46-N exceeding the threshold value constitutes a failure covered under the drive warranty.

On-line collection bit 56-2 indicates when the attribute 46-N is updated. If the on-line collection bit 56-2 is set to 0, the attribute 46-n is updated only during off-line testing. If, however, the on-line collection bit 56-2 is set to 1, the attribute 46-N is either updated only during on-line testing or during both on-line and off-line testing.

As previously set forth, the attribute 46-N may be either a performance, error rate or event count attribute. If the attribute 46-N is a performance attribute, performance attribute bit 56-3 is set to 1 and error rate and event count bits 56-4 and 56-5 are set to 0. Conversely, if the attribute 46-N is an error rate attribute, only the error rate bit 56-4 is set to 1 and if the attribute 46-N is an event count attribute, only the event count bit 56-5 is set to 1.

Self preserving attribute bit 56-6 indicates that the attribute 46-N is an attribute for which information is collected and saved even if drive failure prediction is disabled. Attributes are designated as self-preserving if such attributes will have more validity when always collected. For example, start/stop count is a self-preserving attribute. Finally, the remaining status flag bits 56-7 are reserved for future uses.

The data structure of the attribute 46-N maintains three values of the attribute. The raw value of the attribute is maintained in raw attribute value byte 62. The normalized value of the attribute 46-N is maintained in normalized attribute value byte 58. Finally, as both performance and error rate attributes are reversible-type attributes, i.e. may either worsen or improve over any given period of time, the worst ever normalized value of the attribute 46-N is maintained in worst ever normalized attribute value byte 60. The remaining byte 64 is reserved. Table II, below, lists the various attributes which may be selected for collection.

TABLE II

| Number | Attribute Name |
| --- | --- |
| 0 | Not used |
| 1 | Raw Read Error |
| 2 | Throughput Performance |
| 3 | Spin-Up Time |
| 4 | Start/Stop Count |
| 5 | Re-Allocated Sector Count |
| 6 | Read Channel Margin |
| 7 | Seek Error Rate |
| 8 | Seek Time Performance |
| 9 | Power-On Hours Count |
| 10 | Spin Retry Count |
| 11 | Drive Calibration Retry Count |
| 12 | Drive Power Cycle Count |
| 13–199 | Reserved Attributes |
| 200–255 | Vendor Unique Attributes |

It should be clearly understood that the list of attributes set forth in Table II is, by no means, intended to be a comprehensive listing of all possible attributes which may be selected for monitoring. For example, among the other attributes which may be selected for monitoring are sector reads, sector writes, total seeks, recovered read errors, hard write errors, recovered write errors, seek errors, data request (or "DRQ") timeouts, other timeouts, recovery failed read errors, recovery failed write errors, format errors, power on self test (or "POST") errors, drive not ready errors and physical drive reallocation aborts.

Referring next to FIG. 5, the data structure for the warranty failure thresholds sector 22 in which the threshold values for the drive attributes stored in the drive attribute values sector 20 may now be seen. The warranty failure thresholds sector 22 includes a data structure revision number (or "rev. no.") 68 which identifies the version of the data structure implemented in the warranty failure thresholds sector 22. Initially, the data structure revision number 68 will be set to 0×0003 and incremented by one for each new revision. The warranty failure thresholds sector 22 further includes thirty drive thresholds 70-1 through 70-30, each of which will contain a saved threshold value for the corresponding attribute stored in the drive attribute sector 46-1 through 46-30. Preferably, threshold values stored in the warranty failure thresholds sector 22 should be arranged in the same order as the attribute values stored in the drive attribute values sector 20. Finally, the warranty failure thresholds sector 22 further includes a reserved region 72 for threshold values which correspond to future attributes, a region 74 reserved for threshold values corresponding to attributes unique to a single vendor and a checksum 76 for detecting errors during a write to the warranty failure threshold values sector 22.

Referring next to FIG. 6, the data structure for a warranty failure threshold value will now be described in greater detail. As each warranty failure threshold value 70-N corresponds to an attribute 46-N, attribute ID No. byte 78 uniquely identifies the particular attribute 46-N to which the warranty failure threshold value 70-N corresponds. Warranty failure threshold byte 80 contains the warranty failure threshold value which is compared with the normalized attribute value contained in the normalized attribute value byte 58 to determine whether the attribute 46-N has crossed its warranty failure threshold 70-N. Finally, the warranty failure threshold value 70-N contains a region 82 which is reserved for future uses.

Figure 7A:
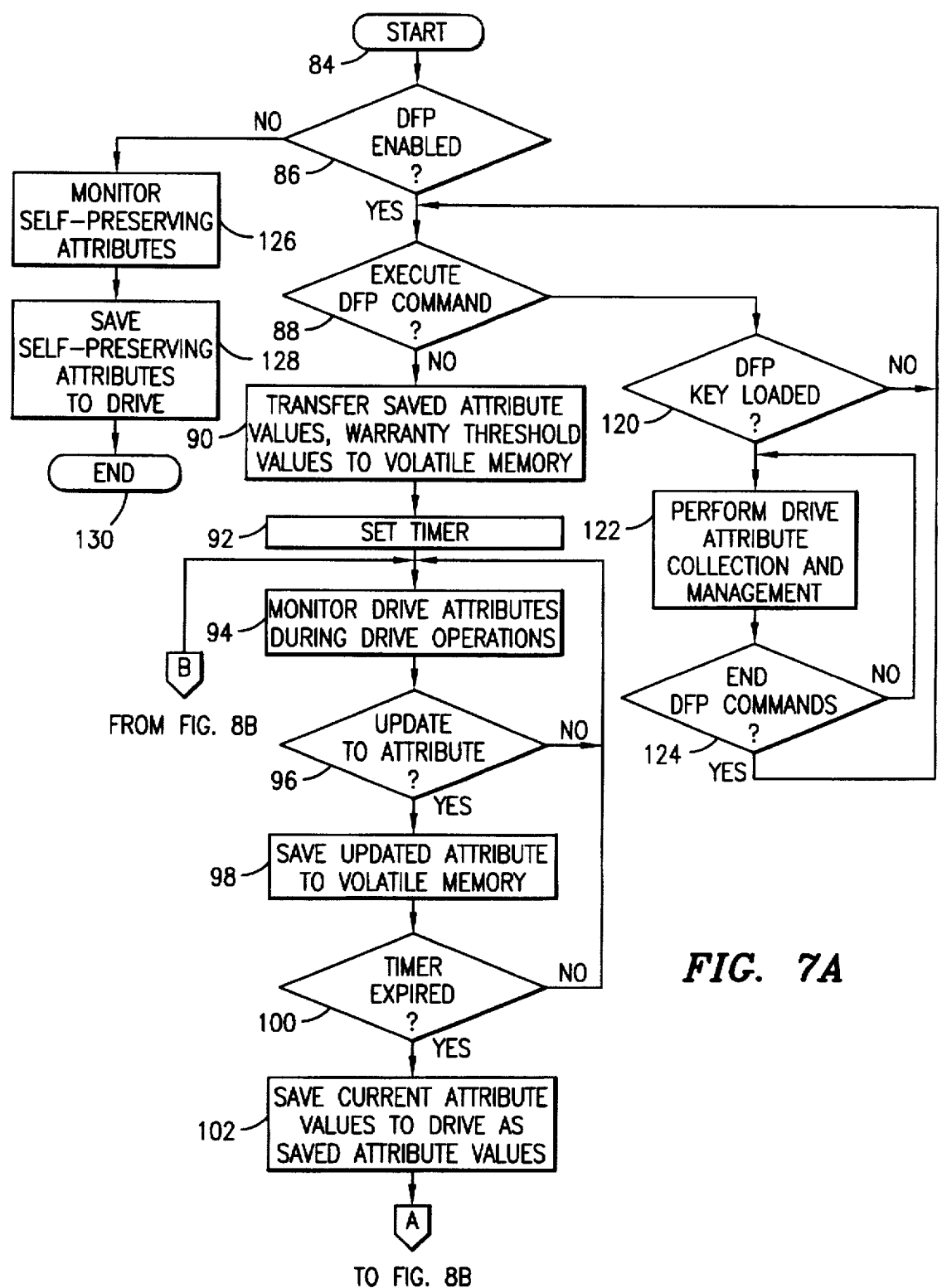
FIGS. 7A-B is a flow chart of a method for predicting an imminent failure of a storage device such as an ATA disk drive.
Figure 7B:
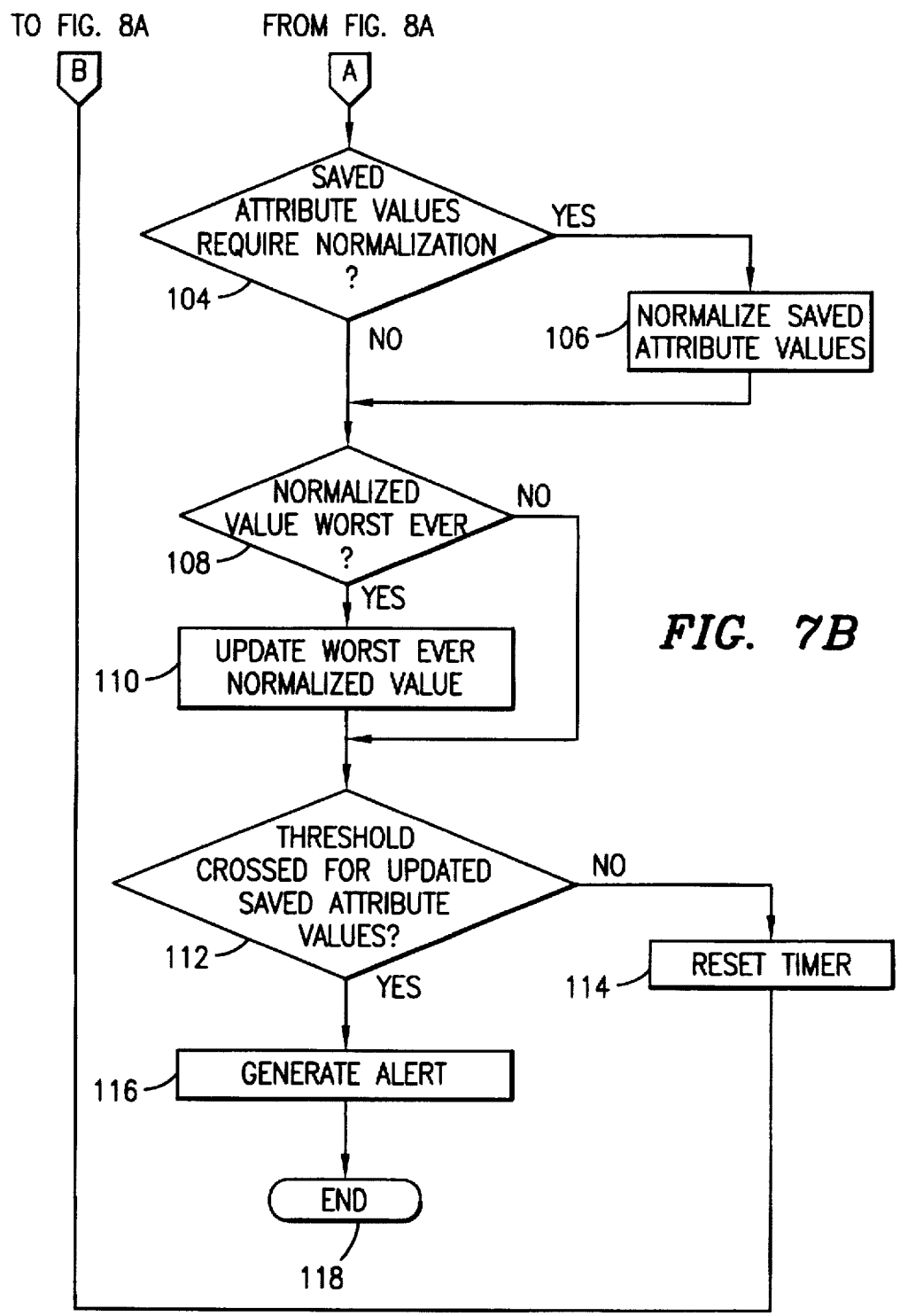

Referring next to FIGS. 7A–B, the method of predicting an imminent failure of an ATA disk drive or other storage device 12 subject of the present invention will now be described in greater detail. The method commences at step 84 by powering-up or resetting the computer system 10. Proceeding to step 86, the host computer 12 checks as to whether drive failure prediction has been enabled as part of the power-on-self-test (or "POST") performed during power-up. Enablement of drive failure prediction is checked by reviewing the status of the enable/disable drive failure prediction flag maintained by the storage device 14.

If it is determined at step 86 that drive failure prediction has been enabled, the method proceeds to step 88 where the host computer 12 awaits a drive failure prediction command. If no drive failure prediction command is received, the method continues on to step 90 where the saved attribute values stored in the drive attribute values sector 20 of the storage device 14 are transferred to the volatile memory of the host computer 12 where they are stored as the current attribute values for the storage device 14. Also transferred to the volatile memory of the host computer 12 at step 90 are the warranty failure threshold values stored in the warranty failure thresholds sector 22 of the storage device 14.

As previously stated, the contents of the current attribute values held in the volatile memory are periodically transferred to the storage device 14 where they are stored in the drive attribute values sector 20 as saved attribute values. Accordingly, at step 92, a timer which is set to time out upon expiration of a selected time period separating successive saves of the attribute values to the storage device 14 is set.

Proceeding to step 94, the host computer 12 monitors each of the selected attributes. More specifically, if the host computer 12 detects the occurrence of an activity within the storage device 14 which will affect one or more of the selected attributes, the host computer 12 will update the appropriate current attribute value stored in the volatile memory of the host computer 12. For example, if the occurrence of a seek error during a read operation is detected, the current value of the seek error rate attribute stored in the volatile memory of the host computer 12 must be updated. Accordingly, if the host computer 12 detects the occurrence of an event related to a drive attribute selected for monitoring, the method proceeds to step 98 where the value of the appropriate drive attribute or attributes is updated by saving the updated drive attribute to the volatile memory.

Continuing on to step 100, if the timer has not yet timed out, i.e. the time period separating successive saves of the attribute values to the storage device 14 has not elapsed, the method returns to step 94 for further monitoring of the drive attributes during drive operations. Continuous monitoring of the storage device 14 and updating of attributes for which occurrences of events are detected is maintained until the timer times out, thereby indicating that the time period between successive saves of the drive attributes to the storage device 14 has elapsed.

Upon expiration of the time period between successive saves of the drive attributes, the method proceeds to step 102 where the current attribute values stored in the volatile memory of the host computer 12 are stored to the drive attribute values sector 20 of the storage device 14 as saved attribute values. Proceeding to step 104, a determination is made as to any of the saved attribute values require normalization. More specifically, normalization may be required if the raw attribute value bytes 62 were changed during the save of the current attribute values to the storage device 14 as saved attribute values.

If the raw attribute value bytes 62 were changed, the method proceeds to step 106 where the normalized attribute value byte 58 is revised if necessary. Normalization is a process by which the raw value of an attribute is given a relative weight for comparison with a threshold value. By normalizing the raw value of an attribute, the method avoids an instantaneous raw value from being improperly interpreted as an imminent failure. For example, if one read error occurs during the first ten read operations, the read error rate will exceed the read error rate threshold and a prediction of an imminent failure of the storage device 14 will be issued even though the storage device 14 could then subsequently execute 1 million additional read operations without error.

Generally, the normalization process must address three phenomena which occur during the data collection process and which may cause inaccuracies in the disclosed method of predicting imminent drive failures. These phenomena are data swamping, data spiking and statistical invalidity. Data swamping occurs when past data overshadows recent data, thereby masking an imminent failure. This problem may be solved by collecting data over a discrete range of samples. Data spikes occur when an attribute has a single departure from its normal operating range. Such spikes may cause a failure prediction even though no such failure is imminent. To avoid data spikes from causing errant failure predictions, several raw data points should be collected before normalizing the raw value of the attribute. Finally, statistical invalidity is a concern with respect to certain attributes, for example, the read error rate discussed above, which require that multiple samples be collected before an accurate calculation can be made.

It should be appreciated by one skilled in the art that characteristics of a given attribute may cause the normalization and statistical validity algorithm to differ from the normalization and statistical validity algorithm for others of the attributes. For example, for the spin-up retry attribute, the total number of spin-up retries which have occurred is stored in the raw attribute value byte 62. If 30 spin-up retries is selected as the warranty threshold value, then the equation set forth below may be used to calculate a normalized value for the spin-up retry count:

$$\text{spin-up retry count} = \frac{(\text{max spin retries} - \text{spin retry count})}{\text{max spin retries}} \times 100$$

where the max spin-up retries equals 30 and the spin-up retry count is accumulated by the drive over 200 spin-ups. Thus, if fifteen spin-up retries occurring per 200 spin-ups is considered to be indicative of a drive that is ready to fail, then the threshold for this attribute would be set to 50.

By normalizing the threshold values, potential misinterpretations of attribute raw counts as indicators of potential failures are avoided. It is specifically contemplated that the end points for all of the normalized attributes will be 1 and 100, although, for performance and error rate type attributes, values greater than 100 are possible.

After normalization of any saved updated attribute values requiring normalization is completed at step 106 or if it was determined at step 104 that none of the saved attribute values required normalization, the method proceeds to step 108 where a determination is made as to whether the normalized value of the attribute is the worst ever normalized value of that attribute by comparing the contents of the normalized attribute value byte 58 and the worst ever normalized attribute value byte 60. If the value of the normalized attribute value byte 58 is greater than the worst ever normalized attribute value byte 60, the worst ever normalized attribute value byte is updated at step 108 by writing the contents of normalized attribute value byte 58 to the worst ever normalized attribute value byte 60.

Proceeding on to step 112, the contents of the normalized attribute value byte 58 is compared to the contents of the warranty failure threshold byte 80 to determine whether the normalized attribute value has crossed the threshold value for that attribute. If it is determined at step 112 that the threshold has been crossed, the method proceeds to step 116 where an alert is generated, for example, by displaying a pop-up window on the display screen of the host computer 12 which contains a message alerting the operator to the imminent failure of the storage device 14. The operator may then use this information to take appropriate corrective action to minimize both data loss and down time. Having issued an alert as to the imminent failure of the storage device 14, the method of the present invention ends at step 118, for example, by the operator powering down the host computer 12 so that repairs may be initiated. It should be understood, however, that if the operator ignores the alert and continues to operate the host computer 12, the method would proceed to step 114 where the timer is reset and then return to step 94 where monitoring of the selected attributes would continue in the manner previously described as if no alert were generated. Alternately, if the operator responds to the alert by disabling drive failure prediction, the method would proceed to step 126, below.

Returning to step 112, if it is determined that the normalized attribute value has not crossed the threshold value for that attribute, the method proceeds to step 114 where the timer is reset and returns to step 94 where monitoring of the selected attributes would continue in the manner previously described.

Returning now to step 88, if the operator wishes to execute one of the drive failure prediction commands set forth in Table I, above, the operator places the desired drive failure prediction command in the command register 42 and the key into the cylinder low and cylinder high registers 36 and 38. Proceeding to step 120, the storage device 42 examines the cylinder low and cylinder high registers 36 and 38 to determine if the key has been placed therein. If the key has been placed in the cylinder low and cylinder high registers 36 and 38, the method proceeds to step 122 where a selected one of the drive failure prediction commands set forth in Table I may be executed. If, however, the key has not been placed in the cylinder low and cylinder high registers 36 and 38, the method returns to step 88.

Proceeding to step 124, if the executed drive failure prediction command is the last command to be performed, the method returns to step 88. If, however, another drive failure prediction command is to be executed, the method returns to step 122 to perform the next requested drive failure prediction command.

Returning now to step 86, if it is determined that drive failure prediction is not enabled, the method proceeds to step 126 where self-preserving attributes are monitored in the same manner previously described with respect to all other attributes even though drive failure prediction is not enabled. The method of monitoring self-preserving attributes while drive failure prediction is disabled differs from that previously described with respect to the monitoring of all attributes when drive failure prediction is enabled only in that no alerts are generated in response to a self-preserving attribute crossing a warranty failure threshold. Proceeding to step 128, monitoring of the self-preserving attributes ends, for example, by powering down the computer or by enabling drive failure prediction, in which case the method would then proceed to step 88.

Figure 8:
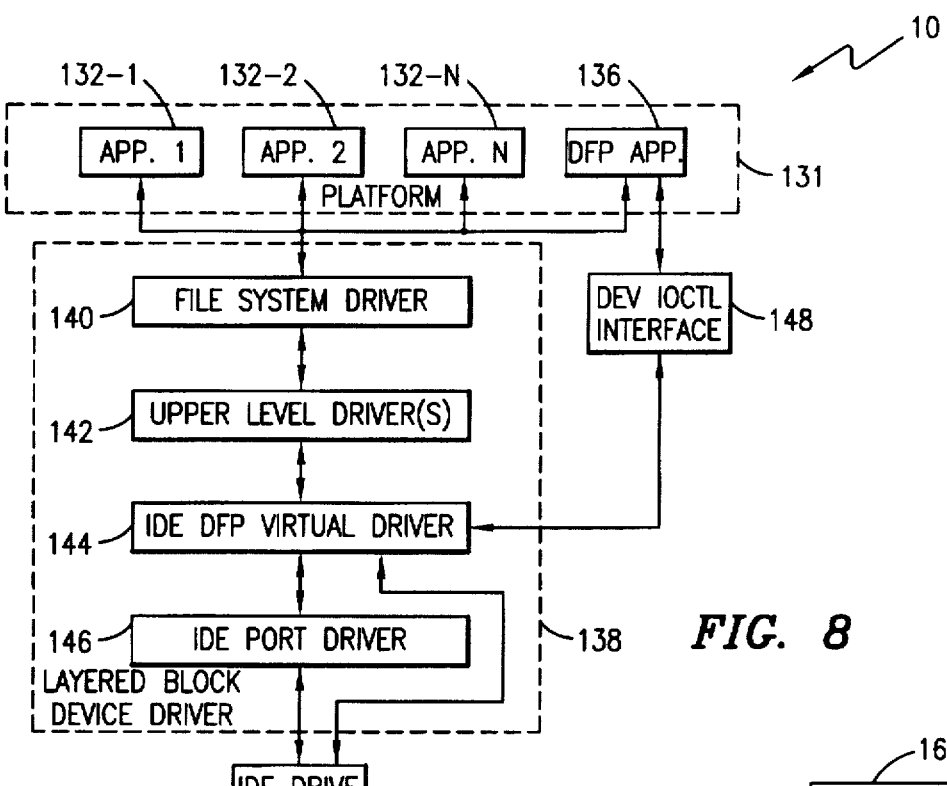
FIG. 8 is a block diagram of the interface between a DFP application and an IDE drive.

Referring next to FIG. 8, the interface between a DFP application 136 and an IDE drive 134 in a Windows 95 operating system will now be described in greater detail. Windows 95 uses a layered block device driver architecture 138, a collection of 32-bit, flat model device drivers, to manage input/output (or "I/O") operations with block devices, i.e., exchanges between applications 132-1 through 132-N and the IDE drive 134. The layered block device driver architecture 138 consists of dynamically-loadable virtual device drivers configured to include a plurality of layers, typically between 3 and 5. Each layer has a specified level of functionality and a driver belonging in that layer must have the specified functionality.

The uppermost level of the layered block device driver 138 contains the file system driver 140. The file system driver 140 manages high-level I/O requests from the applications 132-1 through 132-N. Beneath the file system driver 140 are one or more upper level driver(s) 142, the exact number of which will vary based upon the configuration of the layered block device drivers 138. Typically, the upper level driver(s) 142 will carry out functions which include transitions of I/O requests from a volume orientation to a logical device orientation, from a logical device to a physical device orientation and from a physical device orientation to an adapter orientation. Drivers at higher levels generally deal with logical I/O operations while drivers at lower levels carry out physical I/O to adapters. Beneath the upper level driver(s) 142 in the call-down stack is the IDE DFP virtual driver 144. As will be more fully described later, the IDE DFP virtual driver directs accesses from the various Windows 95 applications 132-1 through 132-N via the file system driver 140 and accesses from the DFP application 136 via the DEV IOCTL interface 148 directly to the IDE drive 134 while replies from the IDE drive 134 are selectively directed to either the DEV IOCTL interface 148 (if their destination is the DFP application 136) or the upper level driver(s) 140 if their destination is elsewhere, for example, a selected one of the applications 132-1 through 132-N. The IDE DFP virtual driver 144 also monitors every command sent to the IDE port driver 146 from the file system driver 140 and records its completion. Thus, when an IDE command is sent to the IDE DFP virtual driver 144 from the file system driver 140, the command is passed to the IDE port driver 146 and a count of the total number of pending commands is incremented. Conversely, when a reply to the IDE command sent from the file system driver 140 is returned by the IDE port driver 146, the count of the total number of pending commands is decremented. When a DFP command is received from the DFP application 136, the IDE DFP virtual driver 144 will queue any later IDE commands from the file system driver 140 until a reply is received. If, however, an IDE command sent from the file system driver 140 is pending when the DFP command is received, the DFP command will be queued until replies to all of the pending IDE commands are received.

Beneath the IDE DFP driver 144 is IDE port driver 146. The IDE port driver 146 transmits accesses received from the IDE DFP driver 144 originating at the one of the applications 132-1 through 132-N to the IDE drive 134 and, in conjunction with the IDE DFP driver 146, handles interrupts and attends to processing returns to the applications 132-1 through 132-N.

Figure 9:
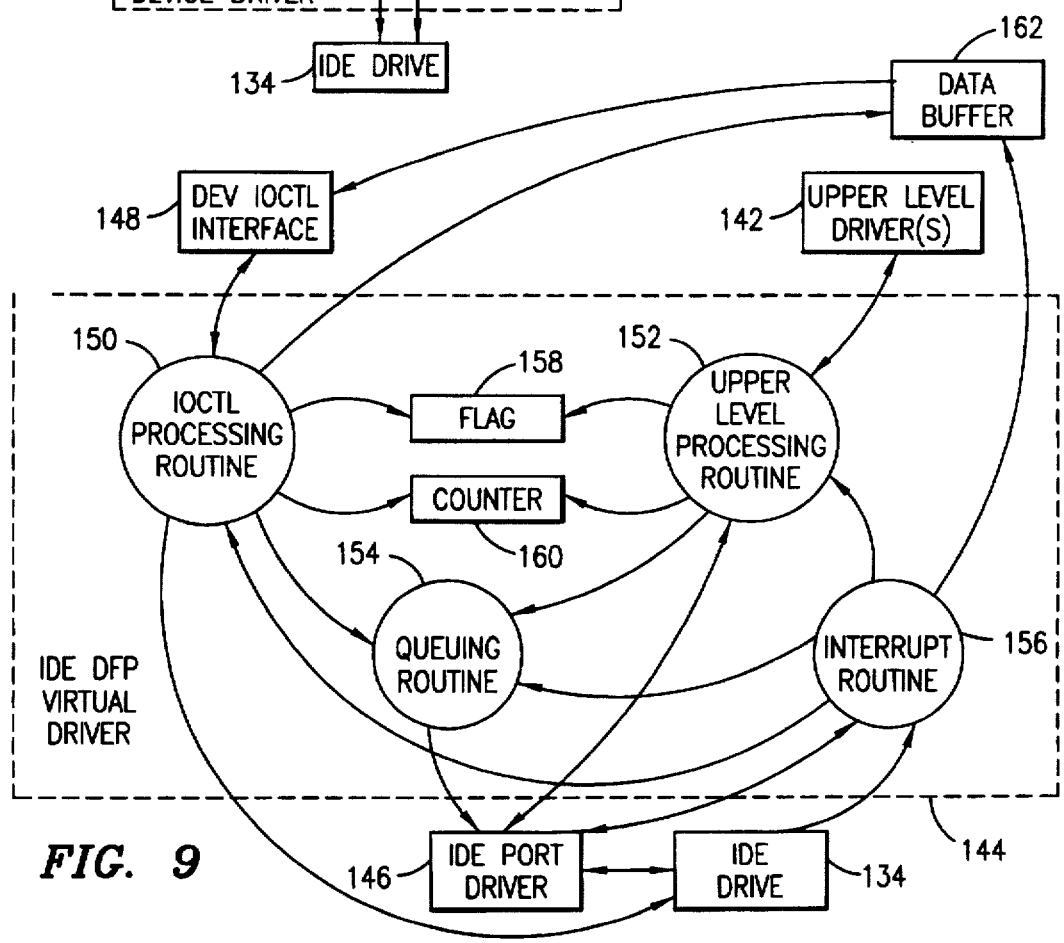
FIG. 9 is a block diagram of the IDE DFP virtual driver of FIG. 8 which also illustrates the method by which the DFP application accesses the IDE port driver.

Referring next to FIG. 9, the IDE DFP virtual driver 144 will now be described in greater detail and the method by which it processes commands from the various applications 132-1 through 132-N and 136 residing on the platform 131 of the computer system 10 will now be described in greater detail. As may now be seen, the IDE DFP virtual driver 144 includes plural routines, each of which handle selected portions of I/O exchanges between either the file system driver 140 or the DFP application 136 and IDE drive 134. These routines include an IOCTL processing routine for handling the transfer of requests received from the DEV IOCTL interface 148 to the IDE drive 134, an upper level processing routine for handling the transfer of requests received from the upper level driver(s) 142 to the IDE port driver 146 and the transfer of replies from the IDE port driver 146 to the upper level driver(s) 142, a queuing routine 154 for queuing received from the upper level driver(s) during processing of requests from the DEV IOCTL interface 148 and an interrupt routine 156 which handles the return of replies from the IDE drive 134 to the DEV IOCTL interface while returning replies from the IDE drive 134 to the upper level driver(s) 142 to the IDE port driver 146 for re-routing to the upper level processing routine 152.

Continuing to refer to FIG. 9, the process by which the IDE DFP virtual driver 144 handles the exchange of messages between the DFP application 136 and the IDE drive 134 and between the file system driver 140 and the IDE drive 134 will now be described in greater detail. The file system driver 140 initiates a request to the IDE drive 134 by placing the request in the upper level driver(s) 142. In turn, the upper level driver(s) 142 transfers the request file to the upper level processing routine 152. The upper level processing routine first checks to see if the DFP application 136 is active, i.e., whether the IDE drive 134 is handling a DFP request, by checking flag 158. If the flag 158 is not asserted, the DFP application 136 is not using the IDE drive 134. The upper level request routine 152 would then increment counter 160 by one and send the request to the IDE port driver 146.

If, however, when the upper level processing routine 152 checks the flag 158 and the flag 158 is asserted, this indicates to the upper level processing routine 152 that the DFP application 136 is active, i.e., the IDE drive 134 is handling a DFP request. If so, the upper level request routine 152 would increment the counter 160 and send the request to the queuing routine 154 where the request would be queued until the queuing routine 154 is notified that the DFP application 136 has released the IDE drive 134. The queuing routine 154 would then deliver the queued requests to the IDE port driver 146 in the queued order.

To initiate an access of the IDE drive 134, the DFP application 136 transfers a request to the DEV IOCTL interface 148. In turn, the DEV IOCTL interface 148 would make an inquiry to the IOCTL processing routine 150 as to whether the file system driver 140 has reserved the IDE drive 134. Upon receipt of an inquiry from the DEV IOCTL interface 148, the IOCTL processing routine 150 checks the counter 160. If the counter 160 is set to zero, there are no pending requests from the file system driver 140. If there are no pending requests from the file system driver 140, the IOCTL processing routine 150 will reserve the IDE drive 134 for the DFP application 136 by setting the flag 158. The IOCTL processing routine 150 then issues a reply to the DEV IOCTL interface 148 which indicates that the IDE drive 134 has been reserved for the DFP application 136. The DEV IOCTL interface 148 would then transmit the request to the IDE drive 134.

If, when the IOCTL processing routine 150 checks the counter 160 and the counter is not set to zero, the IDE drive 134 has already been reserved by the file system driver 140. If so, the IOCTL processing routine 150 would set the flag 158 and block the request from DEV IOCTL interface 148. Requests from the DFP application 136 would be blocked by the IOCTL processing routine 150 until the upper level processing routine 152 has decremented the counter 160 to zero, thereby indicating that the file system driver 140 has released the IDE drive 134. Upon being notified by the IOCTL processing routine 150 that the file system driver 140 has released the IDE drive 134, the DEV IOCTL interface 148 would then unblock and deliver the previously blocked DFP requests to the IDE drive 134 in the order received.

When the IDE drive 134 wishes to reply to a request issued by either the DFP application 136 or the file system driver 140, the IDE drive 134 issues a common interrupt to the interrupt routine 156. As the interrupts generated by the IDE drive 134 are shared, i.e., may relate to requests from either the file system driver 140 or the DFP application 136, the interrupt routine 156 must then discern whether the interrupt is related to a request issued by the DFP application 136 or the file system driver 140. The use of shared interrupts is well known in the art and various techniques by which the interrupt routine 156 may discern the interrupt may be utilized. For example, the interrupt routine 156 may be provided with access to the flag 158. Upon receipt of the shared interrupt, the interrupt routine 156 may check the contents of the flag 158 and, if the flag is enabled, determine that the received interrupt relates to a request issued by the DFP application 136 and, if the flag is disabled, determine that the received interrupt relates to a request issued by the file system driver 140.

If the interrupt routine 156 determines that the received interrupt relates to a request from the DFP application 136, the interrupt routine 156 then arranges for the transfer of information to a data buffer 162 provided by the DFP application 136 and notifies the IOCTL processing routine 150 that DFP information has been placed in the data buffer 162. The IOCTL processing routine then attends to the transfer of control to the DEV IOCTL interface 148, resets the flag 158 to release the reservation of the IDE DFP virtual driver 144 by the DFP application 136 and informs the queuing routine 154 that any queued messages received from the upper level driver(s) may now be transferred to the IDE port driver 146.

If, on the other hand, the interrupt routine 156 determines that the received interrupt relates to a request from the file system driver 140, the interrupt routine 156 routes the interrupt to the IDE port driver 146. The IDE port driver 146 would then arrange for the transfer of information relating to a request by the file system driver 140 back to the file system driver 140. Specifically, the IDE port driver 146 will transfer the file system driver information to the upper level processing routine 152. In turn, the upper level processing routine 152 will decrement the counter 160 by one and transfer the file system driver information to the upper level driver(s) 142. If the counter 160 is decremented back to zero, all messages received from the upper level driver(s) have been processed. By decrementing the counter 160 to zero, the upper level driver(s) 142 reservation of the IDE drive 134 has been released. The upper level processing routine 152 would then notify the IOCTL processing routine 150 that any commands issued by the DFP application 136 which have been blocked by the DEV IOCTL interface 148 may be transferred to the IDE drive 134.

Thus, there has been described and illustrated herein, a layered block device driver which includes a IDE disk fault prediction virtual driver for providing direct access to a storage device coupled to a computer system for a DFP application residing on the computer system's platform and an associated method for enabling the transfer of disk fault prediction commands from the DFP application to the storage device. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. For a computer system having a storage device coupled thereto, a platform, and a disk fault prediction ("DFP") application operating on said platform, a method of predicting an imminent failure of said storage device, comprising the steps of:

issuing, from said DFP application, at least one disk fault prediction command, to said storage device;

selecting an attribute as indicative of an imminent failure of a storage device;

monitoring said selected attribute during operation of said storage device; and predicting an imminent failure of said storage device based upon changes in said monitored attribute, wherein said computer system is coupled to said storage device by a layered block device driver and said DFP application is coupled to said storage device by a DFP interface, an intermediate device driver is independently coupled to said DFP interface; and wherein the step of issuing, from said DFP application, at least one disk fault prediction command, to said storage device further comprises the step of transferring said disk fault prediction command to said interface.

2. A method of predicting an imminent failure of a storage device according to claim 1 wherein said layered block device driver further comprises a file system driver coupled to said computer system and to said intermediate device driver and a port driver coupled to said intermediate device driver and said storage device and further comprising the step of issuing messages from said computer system to said storage device which are not related to disk fault prediction to said file system driver.

3. A method of predicting an imminent failure of a storage device according to claim 2 and further comprising the steps of:

selecting a threshold value for said selected attribute; and predicting an imminent failure of said storage device upon determining that said monitored attribute crosses said selected threshold value.

4. A method of predicting an imminent failure of a storage device according to claim 3 wherein said selected attribute is a performance attribute and wherein the step of predicting an imminent failure of said storage device based upon changes in said monitored attribute further comprises the step of predicting an imminent failure of said storage device upon detecting a degradation in said performance attribute.

5. A method of predicting an imminent failure of a storage device according to claim 4 and further comprising the steps of:

selecting a threshold performance speed for said selected performance attribute; and predicting an imminent failure of said storage device upon determining that said monitored performance attribute has a speed less than said threshold performance speed.

6. A method of predicting an imminent failure of a storage device according to claim 2 wherein said selected attribute is an error rate attribute and wherein the step of predicting an imminent failure of said storage device based upon changes in said monitored attribute further comprises the step of predicting an imminent failure of said storage device upon detecting an increase in said error rate attribute.

7. A method of predicting an imminent failure of a storage device according to claim 6 and further comprising the steps of:

selecting a threshold error rate for said selected error rate attribute; and predicting an imminent failure of said storage device upon determining that said monitored error rate attribute has an error rate greater than said threshold error rate.

8. A method of predicting an imminent failure of a storage device according to claim 2 wherein said selected attribute is an event count attribute and wherein the step of predicting an imminent failure of said storage device based upon changes in said monitored attribute further comprises the step of predicting an imminent failure of said storage device upon detecting an increase in said event rate attribute.

9. A method of predicting an imminent failure of a storage device according to claim 8 and further comprising the steps of:

selecting a threshold event count for said selected event count attribute; and predicting an imminent failure of said storage device upon determining that said monitored event count attribute has an event count greater than said threshold event count.

10. For a computer system having an upper level driver, a storage device coupled to said upper level driver, a platform and a DFP application operating on said platform, a method of predicting an imminent failure of said storage device, comprising the steps of:

reserving said storage device for said DFP application;

directing commands from said DFP application to said storage device;

queuing upper level driver commands while said storage device is reserved by said DFP application;

selecting an attribute as indicative of an imminent failure of said storage device;

monitoring said selected attribute during operation of said storage device; and predicting an imminent failure of said storage device based upon changes in said monitored attribute.

11. A method of predicting an imminent failure of a storage device according to claim 10 and further comprising the steps of:

reserving said storage device for said upper level driver;

directing commands from said upper level driver to said storage device; and queuing said DFP application commands while said storage device is reserved by said upper level driver.

12. A method of predicting an imminent failure of a storage device according to claim 11 and further comprising the steps of:

receiving interrupts from said storage device;

transferring replies from said storage device to said upper level driver if said storage device reply relates to said upper level driver command; and transferring replies from said storage device to said DFP application if said storage device reply relates to said DFP application command.

13. A method of predicting an imminent failure of a storage device according to claim 12 and further comprising the steps of:

selecting a threshold value for said selected attribute; and predicting an imminent failure of said storage device upon determining that said monitored attribute crosses said selected threshold value.

14. A method of predicting an imminent failure of a storage device according to claim 13 wherein said selected attribute is a performance attribute and wherein the step of predicting an imminent failure of said storage device based upon changes in said monitored attribute further comprises the step of predicting an imminent failure of said storage device upon detecting a degradation in said performance attribute.

15. A method of predicting an imminent failure of a storage device according to claim 14 and further comprising the steps of:

selecting a threshold performance speed for said selected performance attribute; and predicting an imminent failure of said storage device upon determining that said monitored performance attribute has a speed less than said threshold performance speed.

16. A method of predicting an imminent failure of a storage device according to claim 12 wherein said selected attribute is an error rate attribute and wherein the step of predicting an imminent failure of said storage device based upon changes in said monitored attribute further comprises the step of predicting an imminent failure of said storage device upon detecting an increase in said error rate attribute.

17. A method of predicting an imminent failure of a storage device according to claim 16 and further comprising the steps of:

selecting a threshold error rate for said selected error rate attribute; and predicting an imminent failure of said storage device upon determining that said monitored error rate attribute has an error rate greater than said threshold error rate.

18. A method of predicting an imminent failure of a storage device according to claim 12 wherein said selected attribute is an event count attribute and wherein the step of predicting an imminent failure of said storage device based upon changes in said monitored attribute further comprises the step of predicting an imminent failure of said storage device upon detecting an increase in said event rate attribute.

19. A method of predicting an imminent failure of a storage device according to claim 18 and further comprising the steps of:

selecting a threshold event count for said selected event count attribute; and predicting an imminent failure of said storage device upon determining that said monitored event count attribute has an event count greater than said threshold event count.

* * * * *